July 30, 1963 J. A. HARR ET AL 3,099,717

LINE CONCENTRATOR SYSTEM

Filed Dec. 24, 1959 4 Sheets-Sheet 1

INVENTORS J. A. HARR
T. N. LOWRY

BY S. E. Hollander

ATTORNEY

INVENTORS J. A. HARR
T. N. LOWRY
BY S. E. Hollander
ATTORNEY

July 30, 1963 J. A. HARR ETAL 3,099,717

LINE CONCENTRATOR SYSTEM

Filed Dec. 24, 1959 4 Sheets-Sheet 3

INVENTORS J. A. HARR
T. N. LOWRY
BY
S.E. Hollander
ATTORNEY

July 30, 1963 J. A. HARR ET AL 3,099,717

LINE CONCENTRATOR SYSTEM

Filed Dec. 24, 1959 4 Sheets-Sheet 4

INVENTORS J. A. HARR
T. N. LOWRY
BY
S. E. Hollander
ATTORNEY

United States Patent Office 3,099,717

Patented July 30, 1963

3,099,717

LINE CONCENTRATOR SYSTEM

John A. Harr, Morris Plains, and Terrell N. Lowry, Boonton, N.J., assignors to Bell Telephone Laboratories, Incorporated, New York, N.Y., a corporation of New York Filed Dec. 24, 1959, Ser. No. 861,809
17 Claims. (Cl. 179—18)

This invention relates to telephone systems and more particularly to arrangements for servicing customers connected to the same telephone line concentrator in a telephone line concentrator system.

The concentration of telephone lines and the connection of a relatively larger number of substation lines to a relatively smaller number of telephone switching paths has characterized telephone switching since its earliest development, In the past, automatic telephone switching equipment in a central office was arranged to "concentrate" the traffic to the succeeding equipment in the office. In this manner a portion of the equipment was not provided on a per substation line basis and instead, for economic considerations, was designed merely to process the expected peak load at the required grade of service.

Recently, however, the telephone switching art has been infused with an increasing interest in remote line concentration, i.e., an arrangement in which substation lines are concentrated at a locale remote from the central office. In remote concentrator arrangements a lesser number of channels or trunks than the number of substation lines is utilized from the point of concentration to the central office. The economic and other benefits that accrue from reduction of cable costs and other outside plant expenditures in remote concentrator arrangements are of substantial significance and have spurred developmental efforts in this area.

As an illustration of a recent embodiment of a two-stage telephone line concentrator system of advanced type, reference may be made to an application of Harr-Lowry-Nehama-Ridinger Serial No. 848,595, filed October 26, 1959.

The advantages which derive from the utilization of a system of this nature are manifold and it is inevitable that the impact in the telephone switching field should be experienced in many quarters.

For example, the area of telephone private branch exchanges, which in recent years has undergone extensive growth, is uniquely adapted to enjoy the advantages which inhere in concentrator systems and related electronic telephone switching systems.

In conventional telephone private branch exchange arrangements, it is customary to provide on the premises of the telephone private branch exchange subscriber, switching facilities for terminating all of the extensions or telephone circuits included within the telephone private branch exchange or PBX. These termination and switching facilities may be either automatic or manual in nature. In either event their ultimate function is to connect a particular extension circuit to the central office over a number of trunks which are customarily less in number than the number of extension circuits.

Although these arrangements are completely operative and useful as evidenced by their increasingly widespread acceptance, a number of manifest disadvantages inhere in the use of conventional PBX systems. For example, since each telephone circuit is terminated at the PBX and has no unique appearance at the central office, direct distance dialing from a PBX circuit represents a major difficulty. The problem is grounded in the nature of the PBX circuit termination and the availability of a connection to the office on a shared basis only. Under these circumstances an effort to obtain the identification of the particular circuit originating a direct distance call on an automatic basis is a formidable obstacle which in the past has been a substantial deterrent to the implementation of direct distance dialing in PBX systems.

Another significant difficulty which is perhaps more serious from the consideration of traffic flow is that an incoming call to a PBX cannot ordinarily be completed on an automatic basis to the called extension without the intervention of an operator at the called PBX.

Since the percentage of traffic originating and terminating at PBX extensions is becoming proportionally more significant, the manual intervention by the operator is manifestly restrictive and has a throttling effect on the flow of otherwise automatic traffic. The magnitude of this problem may be gauged by examining the recent attempts to provide automatic in-dialing to PBX extensions without the necessity of operator assistance. Although completly operative and desirable, these arrangements are often predicated on the incorporation of sophisticated and costly switching arrangements.

It has therefore seemed desirable to utilize the concepts of remote concentrator switching and the superior switching capabilities of electronic telephone switching systems to radically change the philosophy of telephone PBX switching. Thus in lieu of the prosaic arrangement whereby each telephone extension in a PBX is terminated at the local on-premises switchboard or the local PBX automatic switching system each PBX extension is connected to the central office in a manner relatively indistinguishable from that of a private line subscriber, i.e., non-PBX subscriber.

Thus, through a single abrupt departure from conventional switching techniques all of the usual disadvantages which inhere in PBX systems as enumerated above are overcome since each PBX substation line appears in the same form as a private line and the same billing and identification facilities are available for the PBX extension as for the private lines. In a similar manner the obstacles attendant on in-dialing to a PBX extension are eradicated since the same automatic dialing technique may be employed for PBX extensions as for private lines.

It will be appreciated immediately, however, that in the course of connection of all PBX extensions to the central office through a remote concentrator system, certain manifest inefficiencies occur. A striking case is presented in a two-stage concentrator, i.e., where the substation lines are concentrated in a primary stage of concentration and extended over links to a secondary stage of concentration from which a relatively fewer number of trunks extend to the central office. In a situation where two PBX extensions are extended to the same remote primary concentrator, an intra-PBX call, since it must be completed through the central office, will necessitate the use in the originating connection of a line to the primary concentrator, a link to the secondary concentrator, a trunk to the central office, an intra-office trunk or channel, and in the terminating connection a separate trunk back to the same secondary concentrator, a separate link back to the same primary concentrator and finally, the called line. This condition is necessitated in each instance when a calling PBX customer makes an intra-PBX call to a customer on the same remote primary concentrator. The necessity of extending paths from the calling customer to the central office and from the central office to the called customer taxes the existing facilities between the primary concentrator and the central office and limits the usage of these channels by other would-be callers.

It is therefore an object of this invention to provide for telephone connections between customers having a high community of interest without the continued utilization of trunks to and from the central office.

A further object of this invention is to permit telephone communication between selected subscribers connected to a particular primary concentrator over circuits local to said concentrator.

Still another object of this invention is an arrangement for providing for telephone connections between subscribers connected to different concentrators without the continued utilization of channels to the central office.

A further object of this invention is to supervise and control intra-concentrator and interconcentrator connections.

These and other objects and features of the invention may be realized in one illustrative embodiment in which special intra-primary "skew," local or reentrant links are provided in the concentrator network. The skew links provide connections between two link terminations at the primary concentrator in a two-stage concentrator switching system. These additional skew links are located wholly within the concentrator.

When a PBX customer connected to a particular concentrator dials outside the PBX, the call is handled in the conventional manner described in Harr et al. referred to above. If the PBX customer makes an intra-PBX call, however, the central office participates conventionally until answer takes place. At this time both links and both trunks are released and a local connection employing a skew link is established within the primary network.

Incoming calls to the PBX may be dialed directly since each PBX extension is terminated in the same manner as private substation lines.

Additional embodiments of the invention include single stage versions of the intra-primary skew, local or reentrant links and moreover include interprimary skew, local or reentrant links for joining subscribers having a high community of interest but connected to different primary concentrators which in turn are connected to a single secondary concentrator. Still another embodiment includes a single stage arrangement of concentration having interprimary skew or reentrant links.

A feature of this invention includes a primary concentrator in a two-stage concentrator system having a group of skew or reentrant links within the concentrator.

Another feature of this invention includes skew or reentrant links joining different primary concentrators connected to the same secondary concentrator.

Still another feature of this invention is a single stage concentrator including a group of skew or reentrant links within the concentrator.

A further feature of this invention includes a single stage concentrator arrangement in which a plurality of concentrators are joined by skew or reentrant links to provide connections between subscribers having a high community of interest.

These and other objects and features of the invention may be more readily comprehended from an examination of the following specification and attached drawing in which.

For purposes of clarity of presentation, only those portions of the concentrator system described by Harr et al. supra, which are essential to a comprehension of the present invention have been disclosed in detail. For an explanation in depth of the operation of the scanner and related equipment, reference may also be made to an application of Cirone-Harr-Lowry-Ridinger, Serial No. 824,294, filed July 1, 1959, all of which applications are herewith incorporated by reference.

*General Description of Major Components*

Figure 1:
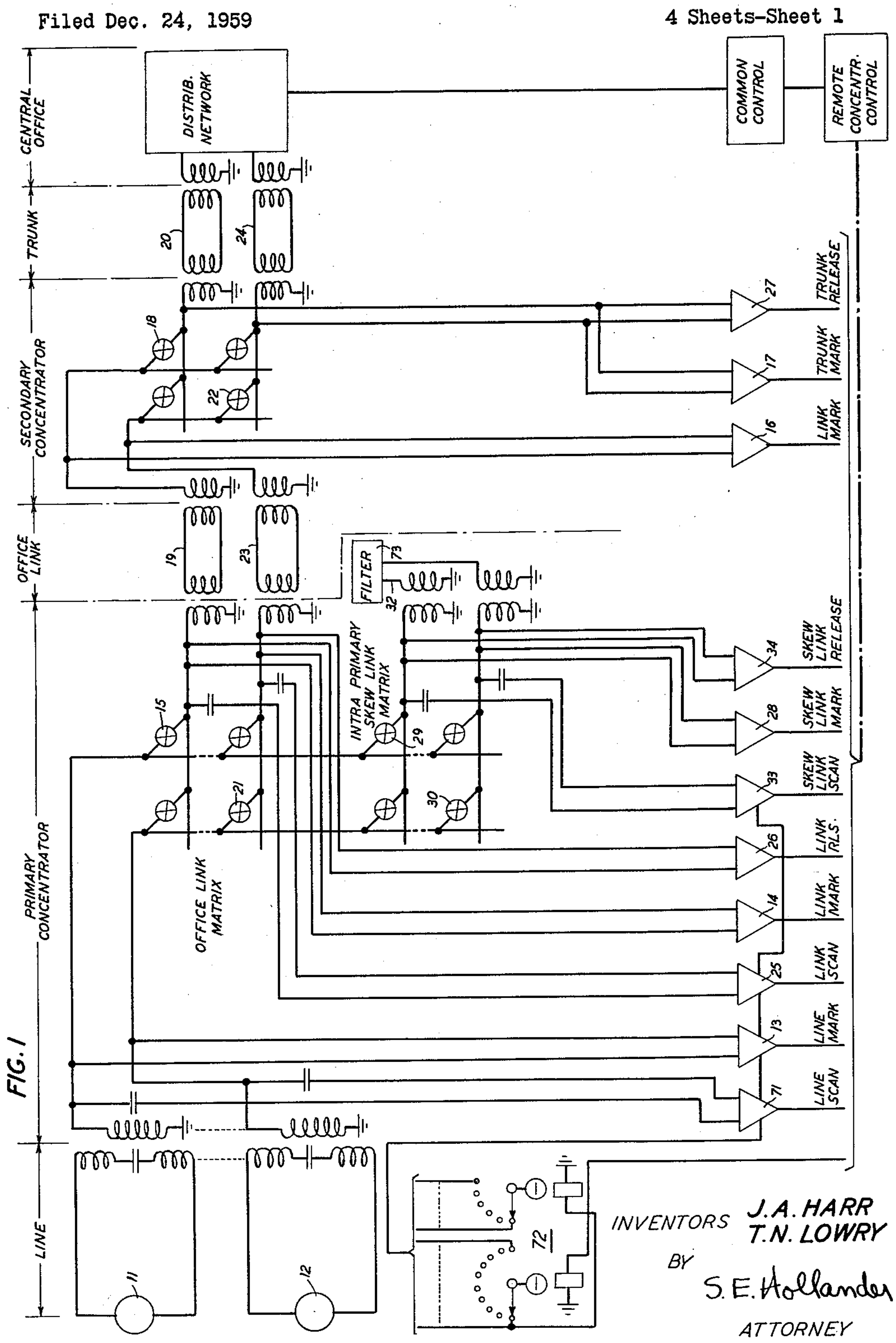
FIG. 1 shows a portion of a two-stage line concentrator system including a skew or reentrant link.

Referring now to FIG. 1 it may be observed that a number of substations 11 and 12 are illustrative or symbolic of as many as 58 substations connected to a particular primary concentrator over individual lines. The primary concentrator stage shown in abbreviated format includes a full access switch for connecting a maximum of 58 subscribers to ten links which join the remote primary concentrator to the remote secondary concentrator. In FIG. 1 the links are symbolically represented by links 19 and 23. It is understood, however, that in practice a greater number of links would be incorporated in the manner shown for links 19 and 23.

The secondary concentrator stage includes a partial access switch for servicing up to 200 links which may be selectively connected to a maximum of 100 trunks that connect the remote secondary concentrator to the central office. These trunks are represented in FIG. 1 by trunks 20 and 24 which extend from the secondary concentrator to the distribution network in the central office.

Both the primary and secondary networks may illustratively be one-wire switches employing PNPN transistor crosspoints. Conversion from two-wire transmission to one-wire transmission is accomplished by means of transformer coupling. Talking battery is supplied in the primary concentrator and crosspoint holding power is also applied locally.

A connection through the remote network is established by selecting an idle path through both stages of concentration. Identifying numbers for the selected link and trunk are then transmitted to the primary and secondary concentrators with a "mark" order.

The remote networks are released from the link side of the remote primary concentrator and the trunk side of the secondary concentrator. Complete records of each connection are stored in a temporary route memory at the central office and the identification of the link and trunk to be disconnected is thus readily available.

The lines and links are scanned on a periodic basis at the remote primary concentrator to detect service requests, answers and disconnects. When any one of these conditions obtains an appropriate control signal is delivered to the central office on the next succeeding interrogation or advance pulse.

The over-all arrangement of the concentrator shown in FIG. 1 is based on a synchronous control system. Each of the lines and links is examined sequentially under control of a counter 72 at the remote primary concentrator. A master counter (not shown) in the remote concentrator control at the central office is stepped in synchronism with the counters in the primaries.

The advantages which inhere in the use of a synchronous control system include simplified identification of a customer initiating a service request. In the present arrangement it is essential only for the remote primary concentrator to forward control information to the central office indicating a service request. At the central office control equipment in the remote concentrator control will examine the line number counter to identify the number of the line at the remote primary concentrator requesting service.

Switching functions are performed in response to information gleaned by line scanner 71 and link scanner 25. Line scanner 71 may illustratively be a two-stage transistor tree or take any other suitable form which is capable of providing a temporary connection between 60 illustrative inputs to the scanner (including one for each line to be examined and two control inputs) and a transmission path to the central office. The link scanner 25 may take a related form which is adapted to provide sequential connections from each of the illustrative ten links 19—23 to a transmission channel to the central office.

The line mark selector 13 may be similar in structure to the scanner 71 and functions to place marking or controlling potentials on the primary switching network shown in outline form and explained further in the Harr et al. disclosure, supra. By virtue of the synchronous operation of the concentrator system, while the line mark selector 13 is being brought into useful proximity with the corresponding terminals of the network representing a line being scanned, the scanner 71 is examining the next succeeding line number. The line scanner 71, link scanner 25, and line mark selector 13 all function in response to advance pulses delivered to line number counter 72 at the primary concentrator. The line number counter is shown symbolically as a stepping switch and may take any suitable form. As each advance pulse is transmitted from the remote concentrator control to the primary concentrator, the line number counter advances one position as does the line scanner 71, the link scanner 25 and the line mark selector 13. The link mark selector 14 and link release selector 26 may also take a form similar to that of the line mark selector 13 and function to place marking and releasing potentials on the primary switching network in the primary concentrator in response to signals from the remote concentrator control also as explained in the Harr et al. application supra.

Thus far the structure and functions disclosed are similar to those enumerated in the Harr et al. application. It will be noted, however, that in the present embodiment the primary concentrator includes, in addition to a crosspoint matrix suitable for connecting substations 11 and 12, etc. to links 19 and 23, etc., a further crosspoint matrix including crosspoints 29 and 30 also connectable to substations 11 and 12, etc. for interconnecting those substations over a plurality of links only one of which, link 32, is shown to preserve simplicity. The crosspoint matrix for connecting calling lines to the skew link 32 is similar in all respects to the crosspoint matrix including crosspoints 15 and 21 for connecting calling lines to links 19 and 23 extending to the secondary concentrator.

The supervision equipment for the additional crosspoint matrix is similar to the supervision equipment discussed above. Thus skew link scanner 33 is individually and sequentially connectable to each of the skew links similar to skew link 32. The skew link scanner 33 may illustratively be a transistor tree or take any other form adapted to provide a temporary connection between the links 32, etc. and a transmission channel for delivering control information to the central office. In a similar manner the skew link mark selector 28 is adapted to individually connect to each of the skew links 32, etc. to provide a temporary connection to a link in order to apply marking potential to a particular selected crosspoint, such as crosspoints 29 and 30. Likewise skew link release selector 34 is adapted to individually connect to each of the skew links 32, etc. to provide a path for effecting release of a selected link by applying a release potential to the appropriate crosspoints 29, 30, etc. Thus it may be observed with regard to the supervision equipment in the primary concentrator that each of the scanning devices is operated sequentially in response to interrogating or advance signals delivered to the counting circuit 72 in the primary concentrator in the form of advance pulses.

A dynamic view of the system in operation would reveal the continual advance in discrete steps of the counter 72 and the line scanning and selector equipment and the link scanning equipment to intermittently effect temporary connections between the supervision equipment and the lines and links.

On the receipt of each advance pulse in the primary counter, detection equipment connected to the line and link scanners is sampled and any supervisory signals which may have appeared reflecting service requests, disconnects, etc. are transmitted back to receiving devices in the remote concentrator control.

This operational routine persists until such time as a service condition at the primary concentrator indicates a need for switching action. In response to a service request for example, an appropriate indication will be delivered by line scanner 71 to the remote concentrator control equipment in the central office and suitable indicating equipment thereat will be set and further advance pulses will cease until the required switching is performed.

*Primary Concentrator Equipment*

As an illustration of the general interrelation of the primary concentrator equipment the response to an off-hook condition at substation 11 will be examined. Appropriate and distinctive changes in the direct-current condition of the line in response to the off-hook condition of the substation will be recognized by line scanner 71 when it next effects a temporary connection to line 11. For further details of the operation of the line scanner reference may be made to the application of Cirone et al., referred to above. In response to an interrogation signal from the central office, detection equipment in the line scanner 71 will return a distinctive signal indicating a service request.

At this time, through equipment in the remote concentrator control, further transmission of interrogation or advance pulses from the central office is halted. Thus the line counter at the primary concentrator remains at the number designating a service request. Moreover, the line mark selector 13 is connected to the same line. In order to effect a connection between the service request indicating line 11 and the central office to permit information regarding the called line to be delivered to the central office, appropriate crosspoints in the primary and secondary concentrators must be closed. Through control signals transmitted by the remote concentrator control to the primary concentrator including a "mark" order, both sides of a particular selected crosspoint in the primary concentrator may be energized. This is accomplished by transmitting a "mark" signal to line mark selector 13 which is connected in a position to apply the potential to one side of crosspoints connected to the service requesting line. The other side of the selected crosspoint is energized by potentials applied by the link mark selector 14 which is operated to connect to a selected idle link under control of signals transmitted by the remote concentrator control. Thus if link 19 were idle, crosspoint 15 may be energized to connect line 11 to link 19 through the application of marking potentials by line mark selector 13 and link mark selector 14 thereby energizing crosspoint 15, which may illustratively be a PNPN crosspoint as described in Harr et al., supra, and the applications therein referred to.

Since the characteristics of PNPN transistor crosspoints permit their deenergization by the application of releasing potential to only one terminal, the link release selector 26 alone can deenergize a particular crosspoint whenever necessary, also under control of signals from the central office remote concentrator control.

It will be appreciated that the crosspoints in the skew link matrix may likewise be closed by signals delivered to the line mark selector 13 and the skew link mark selector 28 to effect connections between a particular calling subscriber and a selected idle skew link. In this case, however, the links are double-ended in the sense that skew link 32 has two separate appearances on the matrix, in distinction to office links 19 and 23. Thus it is possible to connect subscriber 11 to one side of skew link 32 by energization of crosspoint 29 and to connect subscriber 12 to the other side of skew link 32 by the energization of crosspoint 30. This being done, the two subscribers may converse indefinitely over the path provided by the skew link 32. As described above for the case of the office links 19 and 23, skew link release selector 34 functions to deenergize the appropriate crosspoints to disestablish existing skew link connections under control of the central office.

*Secondary Concentrator Equipment*

Heretofore, the control equipment in the secondary concentrator has not been referred to but it will suffice for the purposes of the present explanation to appreciate that the link mark selector 16 is similar in structure to link mark selectors 14 and 28 and may take the form of a transistor tree or any other suitable form for placing marking potentials on individual links in response to signals from the central office. Similarly, trunk mark selector 17 may also be a transistor tree or other apparatus for establishing temporary connections to each of the trunks to permit the application of marking potentials individual thereto in response to signals from the central office. The trunk release selector 27 is similar in form and function to trunk mark selector 17 with the distinction residing in the purpose of applying releasing potentials to selected associated crosspoints thereby deenergizing the crosspoints and discontinuing previous connections. A particular crosspoint in the secondary concentrator, for example crosspoint 18, is energized by transmission of appropriate coded signal information to link mark selector 16 in the secondary concentrator and trunk mark selector 17 to apply marking potential to both sides of crosspoint 18 thereby energizing the crosspoint. For details of the transmission of control signals from the central office to the primary and secondary concentrators to actuate the control equipment thereat, reference may be made to Harr et al. referred to above.

Filter 73 connected in series between the two matrix appearances of skew link 32 functions to prevent the leakage of supervisory signals between links and is adapted to present no substantial impedance to the flow of voice frequency signals. It is important to observe that skew link 32 is embodied wholly within the primary concentrator and has no portions which connect to the secondary concentrator in contradistinction to office links 19 and 23 whose ultimate function is to establish paths from the primary concentrator to the secondary concentrator.

Having thus described the major equipment, a description of the functional operation of the invention in detail will follow.

*Two-Stage Concentrator—Intra-Primary Skew Links*

For purposes of illustration a typical call initiated by a subscriber at substation 11 to a subscriber connected to the same remote primary concentrator at substation 12 will be explained. It will be assumed that the two substations 11 and 12 are connected to the same private branch exchange or PBX and that the call is in effect an intra-concentrator call. When subscriber 11 goes off-hook the line scanner 71 will observe the service request and transmit an indication thereof to the central office. Common control equipment in the central office recognizes the service request and identifies the primary concentrator and secondary concentrator to which the line is connected and also the line number.

After establishing the service request identification, common control proceeds to establish a connection between the central office and the calling substation in order that the subscriber may key or dial the digits of the called number. Common control by reference to a memory selects an appropriate route to effect a connection between substation 11 and the central office including an idle link and an idle trunk. The remote concentrator control equipment at the central office is then energized to transmit the necessary control impulses to effect the connection. These impulses are delivered to the primary and secondary concentrators and energizes the line mark selector 13 and the link mark selector 14 to operate a selected crosspoint 15 in the primary concentrator, as described above. Similarly, the link mark selector 16 and trunk mark selector 17 are also actuated by the control impulses from the central office remote concentrator control to operate a selected crosspoint 18 in the secondary concentrator.

The subscriber at substation 11 is now provided with a path through the remote primary and secondary concentrators to the central office including crosspoint 15, link 19, crosspoint 18 and trunk 20. Equipment located in the central office is actuated to effect a connection between trunk 20 and a digit detector (not shown) to receive signals from substation 11 indicative of the called number, in this case substation 12.

A connection is thereby established between the subscriber at substation 11 and the digit detector, which latter transmits dial tone to the calling subscriber. The subscriber now keys or dials the called directory number into the digit detector.

The necessary translation from the received directory number digits to establish the terminating station equipment number is made and in the assumed illustration common control arrives at a translation representing the equipment number of called substation 12. As a result of the translation information pertaining to the identification of the secondary concentrator, primary concentrator and line number of the called station are obtained. Preparations are thereupon made to establish a terminating call to the latter station.

The central office transmits signals to the primary concentrator to advance the line mark selector 13 to the called line 12. If substation 12 is idle an appropriate idle link and trunk for the terminating connection to substation 12 are selected. Further control signals are now delivered by the central office to the line mark selector 13 and link mark selector 14 to actuate crosspoint 21. Additional control signals are transmitted to the secondary concentrator to operate link mark selector 16 and trunk mark selector 17 to energize crosspoint 22 thereby completing a path from the called substation 12 to the central office including crosspoint 21, link 23, crosspoint 22 and trunk 24. If the called line is still on-hook, common control in the central office arranges a ringing connection to the called substation 12 and an audible ringing tone is applied to the trunk connected to substation 11.

When the called substation answers and the switchhook contacts thereat are closed, this condition is observed at the link scanner 25 and a signal is transmitted to the central office indicating an answer condition. In consequence, the central office discontinues ringing.

At this time common control will refer to memory or storage devices to determine whether a shorter or local path can be established between the calling and called substations. In the assumed illustration the equipment number identification of substations 11 and 12 will indicate that they are connected to the same PBX and the same primary concentrator. In view of this observation, the remote concentrator control prepares to discontinue the established connection from the originating party to the central office and from the central office to the called party and to substitute therefor a local or skew link.

The procedure for releasing the crosspoints in the primary and secondary concentrators is similar to that described in the preceding section and in further detail in Harr et al. supra. A series of code pulses is transmitted to link release selector 26 and to trunk release selector 27 which deenergize crosspoints 15 and 18, respectively, thereby opening the originating connection.

It now remains to establish a connection over a skew link in the primary concentrator between the calling party at substation 11 and the called party at substation 12. In this instance code signals are transmitted to the skew link mark selector 28 and to the line mark selector 13 to energize crosspoint 29 thereby completing a path between the originating party at substation 11 and one end of skew link 32. At this time one-half of the original call has been supplanted by a connection to skew link 32.

Having transferred one-half of the call, namely the originating connection, it is now necessary to process the remaining half of the call. The same procedure is now followed with respect to the terminating subscriber and the previous connections through the primary and secondary concentrators at crosspoints 21 and 22 are discontinued. Appropriate coded signals are transmitted to link release selector 26 and trunk release selector 27 to deenergize crosspoints 21 and 22 thereby disestablishing the terminating connection. Common control now prepares additional orders for the remote concentrators which are delivered to skew link mark selector 28 and line mark selector 13 to energize crosspoint 30 thereby connecting the terminating party to the other half of skew link 32. When the originating and called parties are connected to opposite sides of skew link 32 the two subscribers may converse indefinitely and no further action is required as long as conversation ensues. The skew links are scanned by skew link scanner 33 in the same manner that the conventional office links are scanned by link scanner 25.

When either subscriber connected to the skew link 32 hangs up the condition is observed by skew link scanner 33 and a signal indicative thereof is transmitted to the central office remote concentrator control as described in Harr et al. supra. A release order is formulated by common control and appropriate code signals are transmitted to actuate skew link release selector 34. Assuming that the calling party disconnects first, skew link release selector 34 is actuated to deenergize crosspoint 29. The remaining party at substation 12 will continue connected to skew link 32 until he too goes on-hook. When skew link scanner 33 detects the on-hook condition at substation 12 an appropriate control signal is transmitted to the central office and common control formulates a release order which is transmited to link release selector 34 to deenergize crosspoint 30. When both parties have disconnected the circuit is returned to normal.

*Two-Stage Concentrator Including Interprimary Skew Links*

Figure 2:
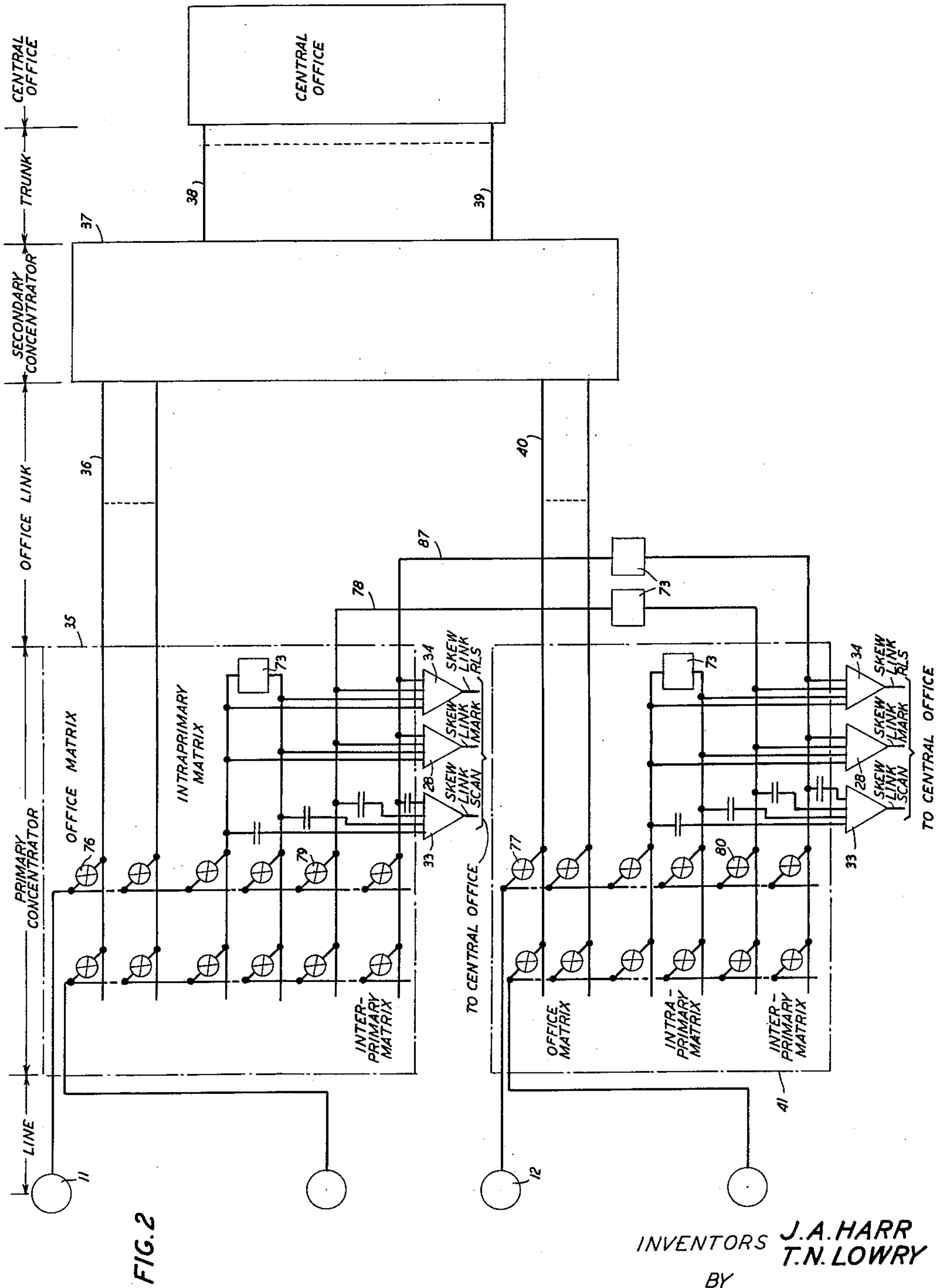
FIG. 2 shows a two-stage concentrator including interprimary and intra-primary links.

In reference to FIG. 2 it may be observed that a number of substations are connected to each of the primary concentrators 35 and 41. These substations are illustrative of a considerably larger number which may be connected to the concentrators. Here again the primary concentrator is shown in abbreviated form and includes a full access switch for connecting 58 substations, for example, to ten links which join the remote primary concentrator 35 to the secondary concentrator 37. These ten links are illustratively represented by link 36, etc. The ten links joining primary concentrator 41 to secondary concentrator 37 are symbolically represented by links 40, etc. The secondary concentrator stage shown in outline form is similar to that shown in FIG. 1. Moreover, trunks 38 and 39 are illustrative of up to 100 trunks that connect the secondary concentrator to the central office.

In referring to FIG. 2, primary concentrator 35 is assumed to be similar insofar as equipment is concerned as the primary concentrator shown in detail in FIG. 1. For clarity of presentation the line number counter 72, line scanner 71 and line mark selector 13 have been omitted. In addition the control equipment associated with the office link matrix as shown in FIG. 1 including the link scanner 25, link mark selector 14 and link release selector 26 have also been omitted.

An examination of FIG. 2 indicates that the significant and compelling departure from FIG. 1 is in the utilization of interprimary skew links 78. These links are utilized to couple the interprimary matrices of primary concentrators 35 and 41.

The interprimary skew links 78 are in all respects similar to the intra-primary skew link 32 shown in detail in FIG. 1 with the distinction residing in the premise that the interprimary skew links physically depart from the primary concentrator confines and are utilized to join geographically distinct primary concentrators.

Thus in a comparison of the intra-primary skew link arrangement of FIG. 1 and the additional equipment shown in FIG. 2, it is apparent that the latter embodiment includes all of the equipment of FIG. 1 including the skew link control equipment. The embodiment of FIG. 2 includes, moreover, a separate interprimary matrix in each primary concentrator and interprimary skew links 78 for coupling the interprimary matrices.

In order to illustrate the operation of the embodiment of FIG. 2 a similar illustrative call will be traced. If it is assumed that a calling subscriber at substation 11 seeks to effect a connection to a called subscriber at substation 12 in FIG. 2, a connection may be extended from the calling subscriber at substation 11 over crosspoint 76, link 36, secondary concentrator 37 and trunk 38 to the central office, as explained above with regard to FIG. 1. This circuit path comprises the originating connection. A similar terminating connection may be made to the called subscriber at substation 12 over trunk 39, secondary concentrator 37, link 40 and crosspoint 77. When the central office has completed the originating and terminating connections and ringing is applied to the called party substation it will be observed also as explained in FIG. 1 that the connection may be satisfied by a shorter or local path which in this case is not an intra-primary skew link as in the previous example but is instead an interprimary skew link.

The originating and terminating connections are released as described above by transmitting control signals to the link release selectors and the trunk release selectors. A local connection is then effected between substation 11 and substation 12 over interprimary skew link 78 including crosspoints 79 and 80. The manner of establishing the skew link path is similar to that explained above with respect to FIG. 1 and includes the transmission of appropriate control signals to the line mark selector, not shown, and the skew link mark selector 28 of concentrators 35 and 41. It may be observed that the interprimary skew link path 78 is in all respects similar to intra-primary skew link path 32 of FIG. 1 with the exception that in the former instance one-half of the link termination is in primary concentrator 35 and the other half is in primary concentrator 41. It will be noted that in FIG. 2 the transformer coupling terminations have been omitted to avoid complexity but it is assumed that they are in all respects similar to that shown in detail in FIG. 1.

After a local interprimary skew link connection has been effected, a path exists between the calling subscriber at substation 11 and the called subscriber at substation 12 which does not include any "higher level" channels such as links 36, 40, etc. to the secondary concentrator or trunks 38, 39, etc. to the central office. These latter channels for additional traffic are thus freed for additional traffic.

Conversation may now ensue indefinitely between the calling and called parties at substations 11 and 12, respectively, over the interprimary skew link path 78. When the parties disconnect, release of the crosspoints 79 and 80 is performed in the manner described above with reference to FIG. 1. In this instance skew link scanner 33 observes the hangup condition and a signal indicative thereof is transmitted to the central office remote concentrator control as described in Harr et al. supra. A release order is again formulated in common control and appropriate code signals are transmitted to actuate skew link release selector 34 in the appropriate primary concentrator 35 or 41. As in the former illustration the second party to hang up will remain connected to skew link 78 until the second substation goes on-hook. A similar procedure is then followed to disconnect the remaining party. When both parties have been disconnected the circuit is returned to normal.

*Single Stage Concentrator Including Intra-Primary Skew Links*

Figure 3:
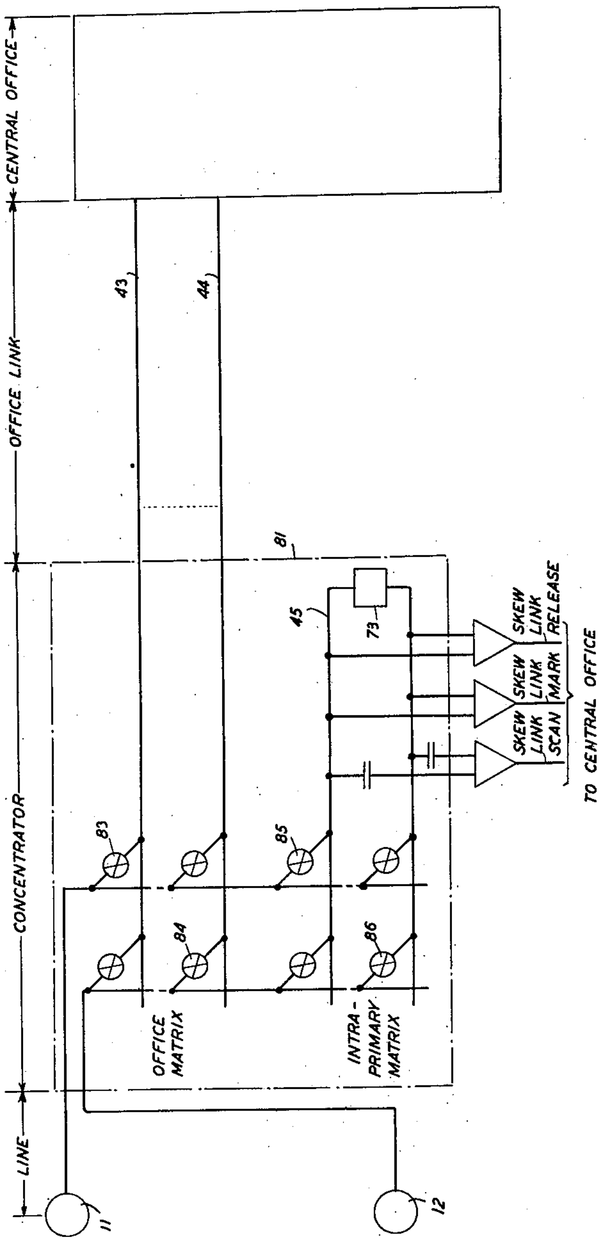
FIG. 3 shows a single stage concentrator including intra-primary links.

Referring now to FIG. 3 a circuit is shown which is in all respects similar to that of FIG. 1 with the modification residing in the absence of multiple concentration stages. Under these conditions, concentrator 81 is joined by links 43, 44, etc. to the central office and skew link 45 is utilized in the manner described in FIG. 1.

Here again links 43 and 44 are illustrative of a considerably larger number of links that connect concentrator 81 to the central office. Moreover, substations 11 and 12 are symbolic of a plurality of substations that may be connected to the concentrator network. The concentrator network itself is shown in abbreviated format and it is understood that the office matrix includes sufficient cross-points to constitute a full access switch for connecting all of the substation lines to all of the links to the central office. The intra-primary matrix shown in concentrator 81 is designed to afford access from each of the lines to each of the skew links, only one of which, skew link 45, is shown in detail. Moreover, as in the case of FIG. 2, the control equipment for the office matrix has been omitted to reduce complexity.

To explain the operation and functioning of the embodiment of FIG. 3 it will be assumed that a customer at substation 11 is seeking to effect a connection to a subscriber at substation 12. Connections will be extended in the usual manner between the central office and substation 11 over crosspoint 83 and link 43 for the originating connection and over crosspoint 84 and link 44 for the terminating connection. Ringing signal is then applied to the called substation and when it is observed at the central office that the connection may be satisfied by a local path the originating and terminating connections are disestablished through appropriate control orders transmitted to the skew link release selector and an idle skew link path, for example skew link 45, is employed in the manner described for FIG. 1 to connect substations 11 and 12 over crosspoints 85 and 86.

Supervision over the intra-primary skew link 45 is maintained by the skew link scanner.

As before when either subscriber connected to the skew link 45 hangs up, the condition is observed by the skew link scanner and a signal indicative thereof is transmitted to the central office. A release order is then formulated and appropriate code signals are returned to actuate the skew link release selector to deenergize the appropriate crosspoint. When both parties have disconnected the circuit is restored to normal.

*Single Stage Concentrator Including Inter-Primary Skew Links*

Figure 4:
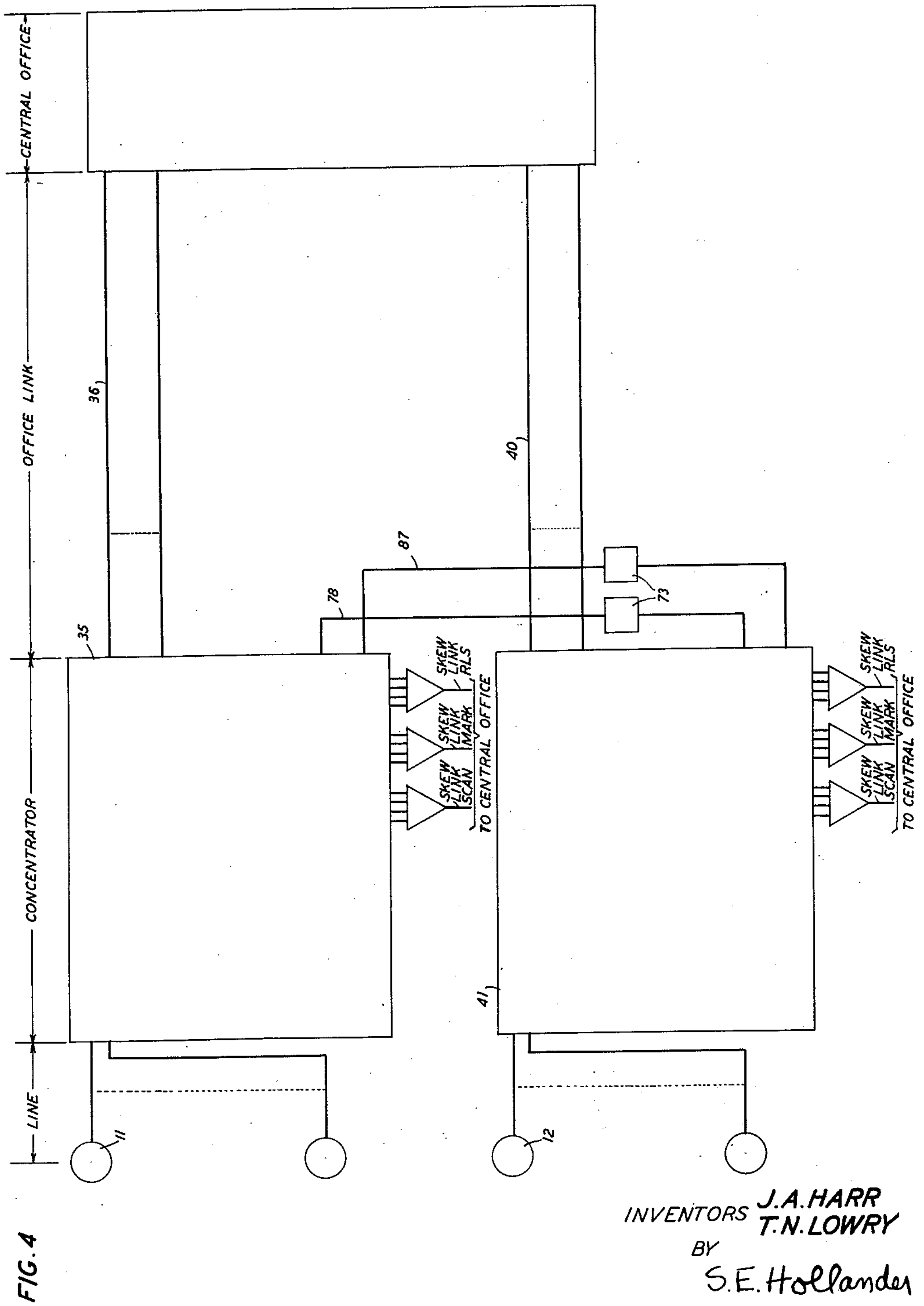
FIG. 4 shows a single stage concentrator including interprimary and intra-primary links.

In FIG. 4 a single stage version of the embodiment of FIG. 2 is shown which is similar in all respects to that of FIG. 2 with the departure residing in the utilization of single in lieu of double concentration. It will be assumed for the purposes of the description of FIG. 4 that the primary concentrators 35 and 41 are similar in all respects to that of FIG. 2. Thus concentrator 35 includes an office link matrix, an intra-primary matrix and an inter-primary matrix. Here again the only control equipment shown is that for the skew link matrices. As usual the few substations connected to the concentrators are representative of a larger number as are the links 36 and 40 connected to the central office. Thus the links between the primary concentrator 35 and the central office may number as many as ten. In addition, the interprimary skew links 78 and 87 are representative of a larger number.

In tracing a typical call between a customer at substation 11 and a customer at substation 12 the conventional originating and terminating connections over links 36 and 40 are utilized to join the originating and terminating substations to the central office. When ringing signal is applied and it is observed that a local path may be implemented (in this case interprimary skew link 78), the appropriate release orders are transmitted to the concentrators 35 and 41 to effect release of the crosspoints in the office matrix and additional mark orders are delivered to the skew link mark selectors to close appropriate crosspoints in the interprimary matrix to effect a connection between the calling party and the called party over an idle interprimary skew link path, for example link 78. Conversation may then ensue for an indeterminate period and release is effected in the manner described above for FIG. 2.

It will be appreciated that in addition to the obvious advantages attendant upon connection of PBX subscribers connected to the same or other primary concentrators, similar benefits may accrue to other parties having a high community of interest such as calls between tenants of an apartment dwelling and the superintendent or manager of the building whose telephones are connected to the same primary concentrator or different primary concentrators interconnected through skew links but who are not necessarily connected to a PBX.

It is to be understood that the above-described arrangements are illustrative of the application of the principles of this invention. Numerous other arrangements may be devised by those skilled in the art without departing from the spirit and scope of the invention.

What is claimed is:

1. A telephone line concentrator system including a plurality of lines, a central office, a plurality of office links less in number than said lines extending from said central office, a line concentrator remote from said office for extending calling ones of said lines to said office over said office links under control of said central office, means at said office for interconnecting a calling one of said lines and a called one of said lines over a path through said office including said office links, and a plurality of intra-concentrator links within said concentrator for thereafter interconnecting said lines under control of said central office.

2. An automatic telephone line concentrator system including a plurality of lines, a central office, a plurality of office links less in number than said lines connected to said central office, a plurality of line concentrators for connecting calling ones of said lines to said office links under control of said central office, and a plurality of interconcentrator links for interconnecting said lines under control of said central office.

3. A telephone line concentrator system including a plurality of lines, a central office, a plurality of office links less in number than said lines connected to said central office, a plurality of concentrators for extending calling ones of said lines to said office links under control of said central office, a plurality of intra-concentrator links within said concentrators for interconnecting said lines under control of said central office, and a plurality of interconcentrator links for interconnecting said concentrators and said lines under control of said central office.

4. An automatic telephone line concentrator system including a plurality of lines, a central office, a plurality of office links less in number than said lines extending from said central office, a plurality of line concentrators for connecting said lines to said links under control of said central office, a plurality of interconcentrator links for interconnecting said lines under control of said central office, means responsive to a calling condition on one of said lines for extending a connection from said line over a first concentrator and a first office link to said central office, additional means responsive to signals from said calling line representative of a called line for extending a connection from said central office to said called line over a second of said office links and a second concentrator, and means responsive to an idle condition on said called line for disconnecting said first and second office links and for transferring said connection to an idle one of said interconcentrator links to provide a talking path between said lines exclusive of said links to said central office.

5. An automatic telephone line concentrator system including a plurality of lines, a central office, a plurality of office links connected to said central office, said links being less in number than said lines, a line concentrator for connecting said lines to said links under control of said central office, a plurality of intra-concentrator links within said concentrator for interconnecting said lines under control of said central office, means in said central office responsive to signals on one of said lines representing another of said lines for establishing a connection between said lines over said office links to said central office, and means for thereafter releasing said office links to said central office and transferring the connection to an idle one of said intra-concentrator links to provide a talking path between said lines exclusive of said office links to said central office.

6. A telephone line concentrator system including a plurality of lines, a central office, a plurality of office links less in number than said lines, primary concentrator means for connecting said lines to said links under control of said central office, a plurality of trunks less in number than said links and connected to said central office, a secondary concentrator for connecting said links to said trunks under control of said central office, and a plurality of intra-primary local links within said primary concentrator for interconnecting said lines under control of said central office to provide a talking path between said lines exclusive of said office links and said trunks to said central office.

7. An automatic telephone switching system including a plurality of lines, a central office, a plurality of office links less in number than said lines, a plurality of primary concentrators for connecting said lines to said office links, a plurality of trunks less in number than said office links connected to said central office, a plurality of secondary concentrator means for connecting said links to said trunks under control of said central office, said primary concentrators including a plurality of interprimary local links connected between said primary concentrators for interconnecting said lines under control of said central office.

8. An automatic telephone line concentrator system including a plurality of lines, a central office, a plurality of office links less in number than said lines, a plurality of primary concentrators for connecting said lines to said office links under control of said central office, a plurality of trunks less in number than said office links and connected to said central office, a plurality of secondary concentrator means for connecting said office links to said trunks under control of said central office, a plurality of interprimary local links coupling said primary concentrators for interconnecting said lines under control of said central office, and a plurality of intra-primary local links within said primary concentrators for interconnecting said lines under control of said central office.

9. A two-stage telephone line concentrator system including a plurality of lines, a central office, a plurality of office links less in number than said lines, a plurality of primary concentrators for connecting said lines to said office links under control of said central office, a plurality of trunks less in number than said office links and connected to said central office, secondary concentrator means for connecting said office links to said trunks under control of said central office, said primary concentrators including a plurality of intra-concentrator local link connections for interconnecting said lines under control of said central office, means responsive to a calling condition on one of said lines for establishing a connection from said line to said central office over a path including a first of said primary concentrators and a first of said office links, additional means responsive to signals from said calling line representative of a called line connected to said first concentrator for extending the connection from said central office to said called line over a path including a second of said office links and said first primary concentrator, and means for thereafter releasing said first and second office links and for transferring the connection to an idle one of said intra-concentrator links to provide a talking path between said calling and called lines exclusive of any channels to said central office.

10. An automatic telephone line concentrator system including a plurality of lines, a central office, a plurality of office links less in number than said lines, a plurality of primary concentrators for connecting said lines to said links under control of said central office, a plurality of trunks less in number than said links connected to said central office, secondary concentrator means for connecting said office links to said trunks under control of said central office, intra-primary concentrator local links within said primary concentrators for interconnecting said lines under control of said central office, a plurality of interprimary local links for coupling said primary concentrators and for interconnecting said lines under control of said central office, means responsive to a calling condition on one of said lines for extending a connection from said line to said central office, means responsive to signals from said calling line representing a called line for extending a connection over one of said office links and one of said trunks to said central office and further over another of said trunks and another of said office links to said called line, and means for thereafter releasing said office links and trunks and for transferring the connection to one of said interprimary local links to provide a talking path between said calling and called lines exclusive of channels to said central office.

11. A telephone line concentrator system including a plurality of lines, a central office, a lesser plurality of office links extending from said central office, a plurality of line concentrators for connecting said lines to said office links under control of said central office, a plurality of intra-concentrator local links within said concentrators for interconnecting said lines under control of said central office to provide a communication path exclusive of said office links, scanning means at said concentrators for examining the service condition of said lines and office links and for supplying indications thereof to said central office, and additional scanning means at said concentrators for examining the service condition of said intra-concentrator local links and for supplying indications thereof to said central office.

12. A telephone line concentrator system in accordance with claim 11 including in addition a plurality of interconcentrator local links coupling said concentrators for interconnecting said lines under control of said central office to provide a communication path exclusive of said office links, said additional scanning means being connectable to said interconcentrator local links to examine the service condition thereof and to supply indications thereof to said central office.

13. A two-stage telephone line concentrator system including a plurality of lines, a central office, a plurality of office links less in number than said lines, primary concentrator means for connecting said lines to said office links under control of said central office, a plurality of trunks less in number than said office links and connected to said central office, secondary concentrator means for connecting said office links to said trunks under control of said central office, said primary concentrator including a plurality of intra-concentrator local links for interconnecting said lines under control of said central office to provide a communication path exclusive of said office links and trunks, scanning means at said primary concentrator for examining the service condition of said lines and links and for supplying indications thereof to said central office, and additional scanning means at said primary concentrator for examining the service condition of said intra-concentrator local links and for supplying indications thereof to said central office.

14. A two-stage telephone line concentrator system in accordance with claim 13 including in addition a plurality of interconcentrator local links coupling said concentrators for interconnecting said lines under control of said central office to provide communication paths exclusive of said office links and trunks, said additional scanning means being connectable to said interconcentrator local links to examine the service condition thereof and to supply indications thereof to said central office.

15. A telephone line concentrator system including a plurality of lines, a central office, a plurality of office links less in number than said lines and connected to said central office, a plurality of line concentrators for connecting said lines to said office links under control of said central office, and a plurality of interconcentrator local links coupling said concentrators to interconnect said lines under control of said central office to provide talking paths exclusive of said office links, scanning means at said concentrators for examining the service condition of said lines and office links and for supplying indications thereof to said central office, additional scanning means at said concentrators for examining the service condition of said local links and for supplying indications thereof to said central office, line mark selector means and link mark selector means at said concentrators individually connectable to said lines and office links to effect connections therebetween, link release means at said concentrators individually connectable to said office links to release said connections, local link mark selector means at said concentrators individually connectable to said local links to effect connections between said lines and local links, and local link release means at said concentrators individually connectable to said local links to release said interconcentrator connections.

16. A telephone line concentrator system in accordance with claim 15 including in addition a plurality of local intra-concentrator links within said concentrators for interconnecting said lines under control of said central office to provide communication paths exclusive of said office links, said additional scanning means being connectable to said intra-concentrator local links to examine the service condition thereof and to supply indications thereof to said central office, and said local link mark selector means and local link release means being additionally connectable to said intra-concentrator local links to effectuate connections between said local links and said lines and to release said connections.

17. A two-stage telephone line concentrator system including a plurality of lines, a central office, a plurality of office links less in number than said lines, a plurality of primary concentrators for connecting said lines to said office links under control of said central office, a plurality of trunks less in number than said office links and connected to said central office, secondary concentrator means for connecting said office links to said trunks under control of said central office, said primary concentrators including a plurality of interconcentrator local link connections for interconnecting said lines under control of said central office to provide conversation paths exclusive of said office links, scanning means at said primary concentrators for examining the service condition of said lines and links and for supplying indications thereof to said central office, additional scanning means at said primary concentrators for examining the service condition of said interconcentrator local links and for supplying indications thereof to said central office, line mark selector means and office link mark selector means at said primary concentrators individually connectable to said lines and office links to effect connections therebetween, office link release means at said primary concentrators individually connectable to said office links to release said connections, local link mark selector means at said primary concentrators individually connectable to said local links to effect connections between said lines and local links, and local link release means at said primary concentrators individually connectable to said local links to release said connections.

References Cited in the file of this patent

UNITED STATES PATENTS

| | | |
|---|---|---|
| 2,080,486 | Kelly | May 18, 1937 |
| 2,092,465 | Matthies | Sept. 7, 1937 |
| 2,142,664 | Wochinger | Jan. 3, 1939 |